United States Patent [19]

Okamoto et al.

[11] Patent Number: 4,517,280
[45] Date of Patent: May 14, 1985

[54] PROCESS FOR FABRICATING INTEGRATED OPTICS

[75] Inventors: Kenji Okamoto; Yoshikazu Nishiwaki; Shunji Matsuoka; Yozo Nishiura, all of Osaka, Japan

[73] Assignee: Sumitomo Electric Industries, Ltd., Osaka, Japan

[21] Appl. No.: 548,591

[22] Filed: Nov. 3, 1983

[30] Foreign Application Priority Data

Nov. 4, 1982 [JP] Japan .................. 57-194150
Nov. 6, 1982 [JP] Japan .................. 57-194817

[51] Int. Cl.³ ............................................. G03C 5/00
[52] U.S. Cl. ........................... 430/321; 156/659.1; 427/162
[58] Field of Search ............ 130/321; 427/162, 165; 156/659.1

[56] References Cited

U.S. PATENT DOCUMENTS

| | | | |
|---|---|---|---|
| 3,961,102 | 6/1976 | Ballantyne | 430/321 |
| 4,203,649 | 5/1980 | Velasco | 427/160 |
| 4,241,109 | 12/1980 | Johnson | 427/162 |
| 4,321,282 | 3/1982 | Johnson | 427/162 |
| 4,393,126 | 7/1983 | Kojima | 430/321 |
| 4,426,440 | 1/1984 | Thompson | 427/162 |

OTHER PUBLICATIONS

Heflinger "Submicron Grating Fabrication on GaAs by Holographic Exposure", Optical Engineering, vol. 21, No. 3, pp. 537-541, 5(1982).

*Primary Examiner*—John D. Smith
*Attorney, Agent, or Firm*—Sughrue, Mion, Zinn, Macpeak & Seas

[57] ABSTRACT

A process for making a diffraction grating pattern on a substrate is disclosed. The process comprises the steps of coating the substrate with first and second materials, with one of the materials defining a selected area for the diffraction grating pattern, and the other material covering the substrate while forming a window at that portion of the substrate where the diffraction grating is desired. The window portion of the substrate is then etched, and the first and second materials are stripped off in order to leave behind the diffraction grating pattern at the desired location of the substrate.

12 Claims, 15 Drawing Figures

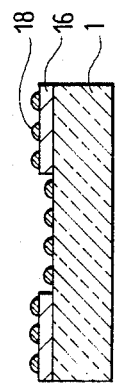
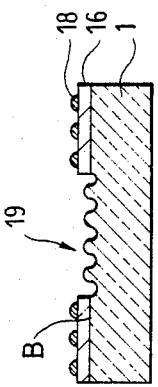
FIG.4(1)
FIG.4(2)
FIG.4(3)
FIG.4(4)
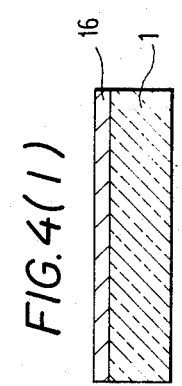
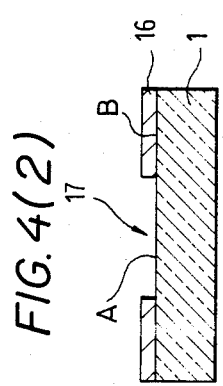
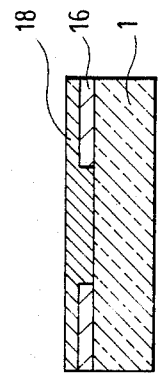
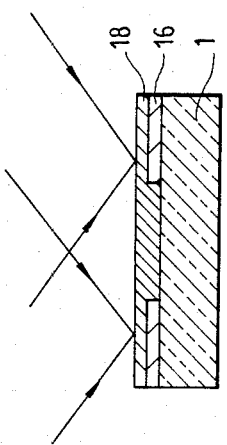
FIG.4(5)
FIG.4(6)
FIG.4(7)

PROCESS FOR FABRICATING INTEGRATED OPTICS

BACKGROUND OF THE INVENTION

The present invention relates to a process for making a diffraction grating having a desired period and size in a desired location of a semiconductor substrate.

Integrated optics having semiconductor lasers, optical guides, optical modulators or optical demulti plexers formed monlithically on the semiconductor substrate are of interest because these devices are considered promising in the fields of optical communications and optical information processing.

Functional devices in integrated optics include optical multiplexers and demultiplexers which are important components for wavelength multiplexing, distributed feedback lasers, and deflecting mirrors. In order to fabricate these functional devices, the diffraction grating of a substrate in waveguide form is a particularly important basic element.

The development of technology for making a diffraction grating of a desired period and size in a desired location of a semiconductor substrate is indispensable to the commercial implementation of integrated optics.

Currently, there are two methods for fabricating the diffraction grating of a substrate in waveguide form, i.e. the holographic exposure method and electron-beam exposure.

In the electron-beam exposure method, a diffraction grating or other devices is formed on a semiconductor substrate by irradiation of a fine electron beam through a photoresist or oxide film. The scanning of the electron beam can be effected according to a computer-programmed pattern. By using the electron-beam exposure method, a diffraction grating of the desired size can be defined in the desired location of the substrate. However, the diameter of the electron beam is finite and cannot be made smaller than a certain limit (e.g. 0.1 $\mu$m). It is therefore difficult to define a pattern with a very small period, although this is required for the diffraction grating to be formed in an optical integrated circuit. The lower limit of the period of the grating that can be formed by the current technology of holographic exposure is 0.5 $\mu$m, which is not small enough to provide the microfine structure necessary for the diffraction grating in an optical integrated circuit.

A schematic diagram of the optics used in the holographic exposure method is illustrated in FIG. 1. A semiconductor substrate 1 has a photoresist or masking agent, such as silicon dioxide coating 2. A laser 3 such as a He-Cd laser emits a coherent light having a wave length of 4416 Å. The laser light passing through a shutter 4 is reflected from a mirror 5 and split into two beams by a beam splitter 6. Each beam is expanded by beam expanders 7, 7. The respective expanded beams which now resemble a plane wave are reflected by mirrors 8, 8 and fall on the substrate 1 from opposite sides at an angle incidence angle $\theta$.

The beams, which are components of the coherent light form an interference pattern in a direction normal to the direction of its incidence. Upon exposure, these bands are recorded on the photoresist 2. By subsequent etching of the substrate 1, periodic ridges and grooves are formed on the substrate.

The period of the interference pattern formed by the holographic exposure method is given by:

$$d = (\lambda / 2n \cdot \sin\theta) \quad (1)$$

wherein $\lambda$ is the wavelength of the laser light; n is the refractive index of the medium in contact with the resist; and $\theta$ is the angle at which the laser light falls on the substrate.

According to the holographic exposure method, a diffraction grating of an adequately small period can be made using a visible laser operating at shorter wavelengths, such as a He-Gd laser. The period of the grating is in the order of submicrons necessary for optical communication with visible light or near-infrared light. However, the need for causing two expanded beams to interfere with each other makes it difficult to form a diffraction grating in a very small limited area.

In order to provide a diffraction grating of a desired shape and size in a desired location, an attempt has been made to expose a limited area of the substrate through a slit or mask 9 placed on the photoresist 2 as shown in FIG. 2. However, the thickness of the slit or glass mask is not zero, and each beam of the laser light falling on the resist 2 through an aperture or transparent portion bends at the edge of the aperture or transparent area. As a result of this phenomenon (diffraction), the laser beam does not provide a regular plane wave but an irregular pattern of interference pattern, and a desired diffraction grating pattern is not obtained.

SUMMARY OF THE INVENTION

The present invention has been designed to overcome the drawbacks of the prior art by providing an improved process for making a diffraction grating in a very small area of a semiconductor substrate.

The process involves applying first and second materials to a substrate. One of the materials is used to form a diffraction grating pattern on the substrate while the other material substantially covers the substrate while forming a window at that portion of the substrate where the diffraction grating pattern is desired. The window portion of the substrate is then etched, and then the first and second materials are stripped off from the substrate in order to leave behind the diffraction grating pattern at the desired location of the substrate.

BRIEF DESCRIPTION OF THE DRAWINGS

FIG. 3(1) shows the step of making a grating pattern on the substrate by holographic exposure; FIG. 3(2) shows the step of applying a second photoresist coating; FIG. 3(3) shows the step of exposing the second photoresist through a mask; FIG. 3(4) shows the development step; FIG. 3(5) shows the etching step; and FIG. 3(6) shows the stripping step; and FIGS. 4(1) through 4(7) comprise a flow chart of the sequence of the process of making a diffraction grating according to the present invention using a thin film directly formed on the substrate: FIG. 4(1) shows the step of coating the substrate with a thin film; FIG. 4(2) shows the step of making a window in the thin film; FIG. 4(3) shows the step of applying a photoresist coating on the thin film; FIG. 4(4) shows the step of subjecting the photoresist to holographic exposure; FIG. 4(5) shows the development step; FIG. 4(6) shows the etching step; and FIG. 4(7) shows the step of stripping the photoresist and thin film.

DETAILED DESCRIPTION OF THE PRESENT INVENTION

A first embodiment of the present invention is hereafter described which uses a photoresist as a thin film to be formed on the first photoresist coating on the semiconductor substrate.

Figure 2:
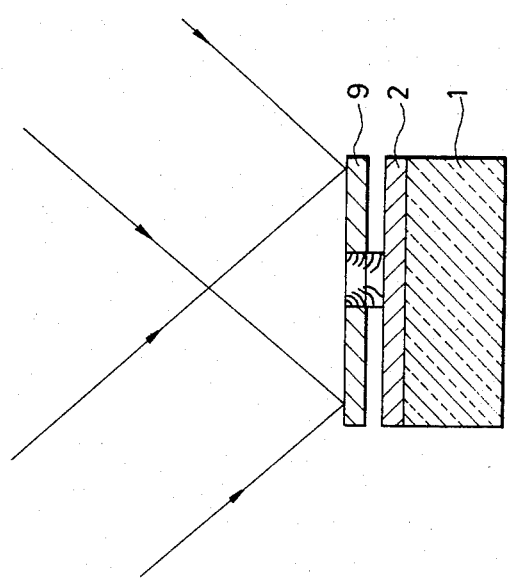
FIG. 2 is a cross section of a photo resist subjected to exposure in a limited area through a slit of glass mask.
Figure 1:
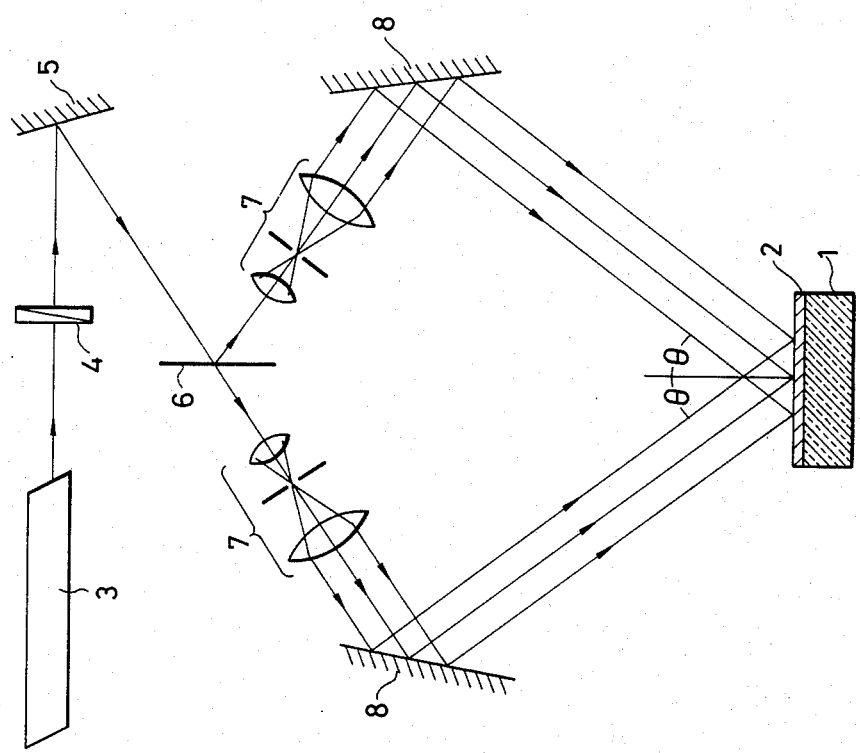
FIG. 1 is a schematic diagram of the optics used in the holographic exposure method.
Figure 3:
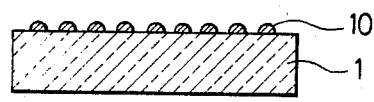
FIGS. 3(1) through 3(6) comprise a flow chart of the sequence of the process of making a diffraction grating according to the present invention using two photoresists acting in different manners.
Figure 3:
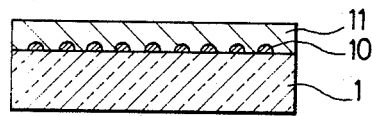
Figure 3:
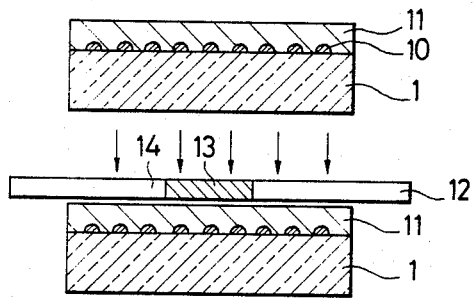
Figure 3:
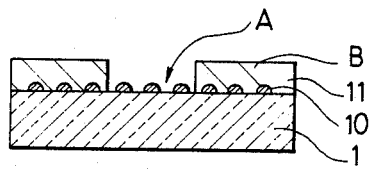
Figure 3:
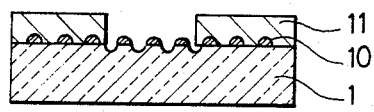
Figure 3:
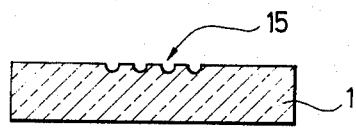

A flow chart of the sequence of making a diffraction grating using two photoresists having different properties is shown in FIG. 3. The substrate 1 is coated with the first photoresist 10, and then is subjected to holographic exposure and development to make a desired diffraction grating pattern. This step is shown in FIG. 3(1). Then, a second photoresist layer 11 is applied to the grating pattern. The second photoresist 11 has different curing properties than the first photoresist. For example, if the first photoresist 10 is positive acting, the second photoresist 11 is negative acting. Conversely, if the first photoresist 10 is negative acting, the second photoresist 11 is positive acting.

Then, as shown in FIG. 3(3), a mask 12 is placed in contact with the second photoresist 11 on the first photoresist 10 and substrate 1, and the structure is then exposed to light falling perpendicularly through the photoresists. This exposure step is for the purpose of removing only that part of the second photoresist 11 where the diffraction grating is to be formed and leaving the other part intact.

When the second photoresist 11 is negative acting, a negative mask is used as the mask 12. In other words, the part of the mask that corresponds to the area where the diffraction grating is to be formed provides a light-shielding section 13, and the remaining part is a transparent section 14. Upon exposure, the part of the second photoresist immediately beneath the transparent section 14 hardens. The part of the first positive-acting photoresist under the light-shielding section 13 is not affected by the incident light, so that the pattern of diffraction grating formed on that photoresist is left intact.

By developing the second photoresist as shown in FIG. 3(4), a window A is made in the area where the diffraction grating is to be formed, exposing the grating pattern on the first photoresist in the window. The other part B is covered with the second photoresist 11.

By subsequent chemical etching, the substrate in the window A is patterned as shown in FIG. 3(5). Finally, the photoresist 10 and 11 are stripped away to leave a diffraction grating 15 behind in the desired location of the substrate.

The foregoing description assumes that the first photoresist is positive acting and the second photoresist is negative acting. The same method can be used to make the desired diffraction grating when the first photoresist is negative acting and the second photoresist is positive acting. In that case, a positive acting mask is used wherein the part which corresponds to the area where the diffraction grating is formed provides a transparent section and the remaining part is a light-shielding section.

The object of the present invention can also be accomplished by substituting another thin film for the second photoresist. However, care must be taken so that the thin film is formed at a temperature low enough to prevent the grating pattern on the first photoresist from being thermally deformed. A preferred example is a thin metal formed by vacuum deposition. A window can be made in the metal film by the conventional photoetching process.

According to a second embodiment of the present invention, the substrate is covered with a thin film which is resistant to chemical etchants. A window is made only in the desired part of the thin film, to expose that part of the substrate which will be provided with a grating pattern. A photoresist coating is provided to cover the exposed surface of the substrate and the remaining thin film, and a substantial or the entire part of the photoresist is subjected to holographic exposure. However, the thin film under the photoresist permits a diffraction grating to be formed only in the desired location of the substrate.

A flow chart of the sequence of the process for making a diffraction grating according to this embodiment is shown in FIG. 4. In the first step shown by FIG. 4(1), a thin film 16 of a uniform thickness is formed on the top of a semiconductor substrate 1. The thin film may be a photoresist, $SiO_2$ film or any other material that is resistant to chemical etchants.

Then, a window 17 is made in the area where the diffraction grating is to be formed. The conventional photolithographic technique may be used for this purpose. The surface of the substrate is exposed in the area A where the window 17 is made, and the other part of the substrate is covered with the thin film. The window A and thin film coverage B are shown in cross section in FIG. 4(2), which depicts the substrate having a window in the thin film.

In the next step, a photoresist 18 is applied to the thin film by spin coating. The photoresist covers the entire part of the substrate and thin film. The photoresist in the window A is in direct contact with the substrate 1. The cross section of the substrate with the thin film and photoresist is shown in FIG. 4(3). The photoresist is then subjected to holographic exposure, as shown in FIG. 4(5).

After development, a pattern for the diffraction grating is formed on the entire surface of the substrate as shown in FIG. 4(5). It is only in the window A that the grating pattern is in direct contact with the substrate. The area B of the substrate remains covered with the thin film 10.

The part of the substrate in the window A is then subjected to chemical etching as shown in FIG. 4(6). As a result, the desired diffraction grating 13 is formed only in the etched area of the substrate. Since the thin film 16 is resistant to chemical etchants, the substrate 1 in area B covered by that thin film remains intact.

Finally, as shown in FIG. 4(7), the resist and the thin film have been stripped to leave behind a diffraction grating 19 in the desired location of the substrate.

After etching the substrate, the $SiO_2$ thin film may be stripped away with hydroflouric acid (HF) which is used to make a window in the thin film in the stop shown by FIG. 4(2). If a photoresist is used as the thin film 16, a window can be made using a developer. After the etching of the substrate, the photoresist and the thin film 16 are stripped away from the substrate by acetone or a chemical stripper because the photoresist has been thermally cured. The thin film such as $SiO_2$ film may be left on the substrate if it has no adverse effects.

The foregoing description assumed the use of $SiO_2$ film or photoresist as the thin film that covers the substrate in area B. But is should be noted that the thin film may be made of other materials such as metals (e.g. Al, Ti and Au) that ensure selective etching of the substrate.

The above described processes, of the first and second embodiments of the present invention, may be performed only once to make a diffraction grating of the same period and direction in more than one region of the same substrate. In order to make diffraction gratings of different periods and directions in more than one region, the same process may be repeated several times.

The present invention has the following advantages:

(i) A diffraction grating of a desired size for use in integrated optics can be made in a desired region of a semiconductor substrate. This is because in the first embodiment of the present invention, a grating can be formed in a limited area of the substrate according to a predetermined pattern on the first photoresist by the patterning of another photoresist formed on that first resist. In the second embodiment of the present invention, a grating pattern is formed in a limited area of the substrate which is not shielded from light by the thin film, and the substrate is etched according to that pattern.

(ii) Diffraction gratings having different periods and directions can be made in several areas of the same substrate. According to the present invention, a grating of a desired period and direction can be formed in a selected area, and by repeating the process, many gratings having different periods and directions can be provided.

The present invention can be used in fabricating various optical devices such as integrated optics, distributed feedback semiconductor lasers, as well as optical multiplexers and demultiplexers.

We claim:

1. A process for making a diffraction grating pattern on a substrate, said process comprising the steps of:
    applying a first material and a second material onto said substrate such that one of said first and second material forms a diffraction grating pattern on a first area of said substrate and the other one of said first and second materials substantially covers a second area of said substrate and does not cover said first area;
    etching the portions of said first area not covered by said one material;
    removing said first and second materials.

2. A process for making a diffraction grating pattern on a substrate, as claimed in claim 1, wherein said applying step comprises:
    forming said diffraction grating pattern on said substrate with said first material;
    coating said diffraction grating pattern with said second material;
    overlaying a mask on said second material;
    exposing said second material to light through said mask; and
    removing said second material from said first area of said substrate.

3. A process for making a diffraction grating pattern on a substrate, as claimed in claim 2, wherein said first and second materials comprise first and second photoresists, said first photoresist having different properties from said second photoresist.

4. A process for making a diffraction grating pattern on a substrate, as claimed in claim 3, wherein said first photoresists is positive acting, said second photoresist is negative acting, and said mask has a transparent portion which overlays said second area.

5. A process for making a diffraction grating pattern on a substrate, as claimed in claim 3, wherein said first photoresist is negative acting, said second photoresist is positive acting, and said mask has a transparent portion which overlays said first area.

6. A process for making a diffraction grating pattern on a substrate, as claimed in claim 2, wherein said first material comprises a photoresist and said second material comprises a thin film.

7. A process for making a diffraction grating pattern on a substrate, as claimed in claim 2, wherein said thin film is comprised of a thin metal film formed by vacuum deposition.

8. A process for making a diffraction grating pattern on a substrate, as claimed in claim 2, wherein said forming step comprises coating said substrate with said first material and subjecting said first material to double beam interference exposure and development.

9. A process for making a diffraction grating pattern on a substrate, as claimed in claim 1, wherein said applying step comprises:
    coating said substrate with said second material;
    cutting a window in said second material at said first area of said substrate; and
    forming said diffraction grating pattern on said substrate with said first material.

10. A process for making a diffraction grating pattern on a substrate, as claimed in claim 9, wherein said second material is resistant to chemical etchants.

11. A process for making a diffraction grating pattern on a substrate, as claimed in claim 10, wherein said first material comprises a photoresist.

12. A process for making a diffraction grating pattern on a substrate, as claimed in claim 9, wherein said forming step comprises coating said second material and said window with said first material and subjecting said first material to holographic exposure and development.

* * * * *